Sept. 18, 1945.　　　S. KELLOGG, 2D　　　2,384,838
GYRO INSTRUMENT
Filed March 25, 1943

INVENTOR
S. KELLOGG, 2ND
BY Herbert H. Thompson
his ATTORNEY

Patented Sept. 18, 1945

2,384,838

UNITED STATES PATENT OFFICE 2,384,838

GYRO INSTRUMENT

Spencer Kellogg, 2d, Glen Head, N. Y., assignor to Sperry Gyroscope Company, Inc., Brooklyn, N. Y., a corporation of New York Application March 25, 1943, Serial No. 480,556

16 Claims. (Cl. 74—5)

This invention relates generally to an improvement in gyro instruments and more particularly concerns a means for obtaining a gravitationally effective torque about one of the axes of support of the rotor frame or case of a device of this character.

One of the features of the invention resides in the provision of a mounting for the gyro rotor in the frame that permits relative displacement to occur between the rotor and frame, which is controlled to a high degree of accuracy by thermal elements. As applied to a gyro-vertical, the differential heating of such elements is controlled by a gravitationally responsive controller associated with the gyroscope; in the case of a directional gyroscope, such elements may be controlled by a manual or automatic controller to cause the directional gyroscope to operate as a slaved compass.

Another feature of the invention consists in the means employed to effect displacement of the noted parts of the gyro instrument and to utilize the same to change the position of the center of gravity of the frame or case and thereby obtain a gravitationally effective torque.

Other features and structural details of the invention will be apparent from the following description when read in relation to the accompanying drawing, wherein Fig. 1 is a plan view of an instrument of the gyro vertical type illustrating one embodiment of the present invention, the outer casing being shown in section and the cover of the rotor case or frame being moved from position.

Figure 1:
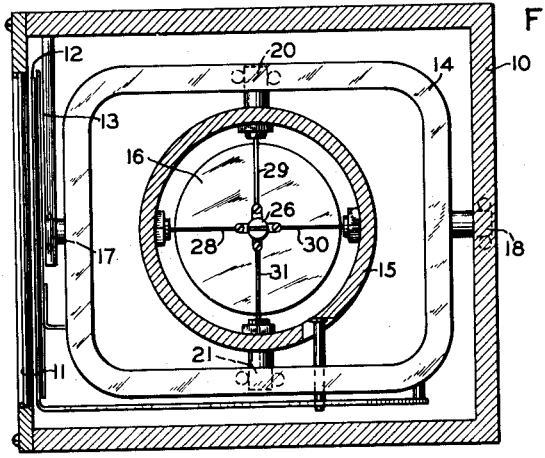
Figure 2:
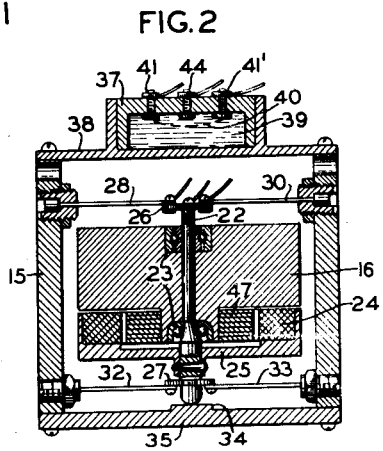
Fig. 2 is a detail vertical section of the rotor case or frame of the instrument shown in Fig. 1.

With particular reference to Figs. 1 and 2, the gyro vertical type of gyro instrument shown includes an outer casing 10 having a front window 11 through which the apparent movements of a horizon bar 12 may be observed with respect to a reference mask 13 to give pitch and roll indications. The gyro vertical part of such artificial horizon type of instrument is provided by gimbal ring 14, rotor case or frame 15 and gyro rotor 16. The gimbal ring 14 is mounted within the casing 10 in a conventional fashion such as by the fore and aft trunnion-bearing connections indicated at 17 and 18. The thusly defined major axis of the gyro instrument is normally horizontal and is parallel to the fore and aft axis of the craft in which the instrument is situated. The rotor case or frame 15 is mounted on the ring 14 to pivot about a horizontal axis normal to the axis of the ring and parallel to the athwartship axis of the craft on which the instrument is located. The thusly defined minor axis of the instrument is provided by the trunnion-bearing connections 20 and 21 in the present instance.

In this form of the invention, the spin axis of the gyro rotor is normally vertical and is defined by a non-rotatable shaft 22 upon which the rotor is mounted by means of bearings 23. The rotor 16 may be spun electrically by a suitable polyphase induction motor of the squirrel-cage type whose stator windings 24 are mounted on a plate 25 fixed to shaft 22. The rotor of the motor, as indicated at 47, is formed as a part of the gyro rotor 16. Electrical energy of a suitable character may be supplied by way of leads (not shown) to the stator of the motor to spin the gyro rotor at the desired speed.

In accordance with the teaching of the present invention, a mounting is provided for the gyro rotor 16 in the frame or case 15 that permits relative displacement of these parts to occur. As shown in Figs. 1 and 2, this mounting includes spiders 26 and 27 located respectively at the top and bottom ends of the non-rotatable shaft 22. The spiders are suitably fixed to the shaft. Equiangularly spaced wire struts 28, 29, 30 and 31 are employed, in this instance, with spider 26. Similar struts are provided for spider 27, as indicated at 32, 32' and 33, 33'. The struts connect the shaft 22 and frame and serve to position the shaft within the frame or case. While the struts may be tensioned to support more or less of the weight of the rotor, I prefer to support all or the greater part of the weight by having the bottom end of the shaft 22 rest on a boss 34 on bottom or base plate 35 of the rotor frame 15, with which it makes sliding contact. One end of each of the wire struts is fixed in position on the spiders 26 or 27. The ends of the struts or wires are adjustably connected to the frame or case 15. The struts also extend radially with respect to the shaft 22 and in this form of the invention, the displacement of the shaft with reference to the case occurs in a radial direction. As arranged in Fig. 1, the struts act in pairs to position the frame and rotor shaft, struts 28, 30 and 32, 33 function to change the position of the center of gravity of the case wtih reference to the minor axis of the instrument. Similarly, the struts in perpendicular relation thereto control the portion of the center of gravity of the frame with reference to the major axis of the instrument.

The case or frame 15 is normally balanced so that the center of gravity thereof lies at the intersection of the major and minor axes of universal support therefor. The displaceably mounted rotor within the frame or case is controlled in such a way that the center of gravity of the frame, which is changed by displacing the rotor, is shifted to a position where it is gravitationally effective to exert a torque about either or both of the axes of universal mounting of the frame. When effective, the mounting arrangement provided permits an erecting, torque exerting, unbalance of the frame or case that is operable about either or both of the axes of universal support provided.

Figure 6:
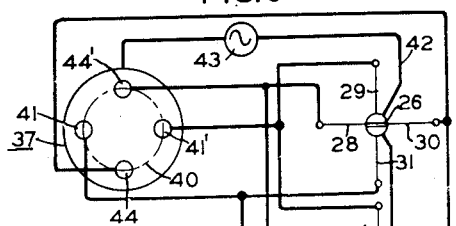
Fig. 6 is a circuit diagram showing the connections used in the form of the invention illustrated in Figs. 1 and 2.

The shaft positioning struts are constructed of a material whose longitudinal dimension may be varied by thermal or magnetostrictive expansion and contraction. A tilt responsive circuit for differentially controlling the mounting means is shown in Fig. 6, the same including a liquid level type of selective switch 36 that is mounted on the cover plate 38 of the rotor frame or case 15. The body of this switch is constructed of insulating material and the fluid 39 is electrically conductive.

The bubble is indicated at 40. Spaced contacts 41, 41' are situated at either side of the minor axis of the case 15 and upon tilt of the case about this axis, the flow of current through one or the other of the contacts is broken. As shown, contact 41' controls the flow of current through struts 29 and 32' which are constructed of thermally responsive material in this instance. Contact 41 is connected to struts 31 and 33' in a similar manner. A common return lead 42 is provided to complete the circuit between the struts and the switch. Electrical energy is provided for the circuit by a suitable source as generally indicated at 43. Contacts 44, 44' for controlling the circuit responsive to tilt of the frame about its major axis connect directly to struts 30, 33 and struts 28, 32, respectively.

Figure 7:
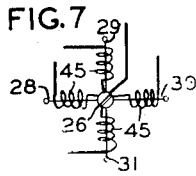
Fig. 7 is a circuit showing an alternative arrangement in which the shaft positioning strut is controlled magneto-strictively instead of thermally.

In operation of the means for effecting relative displacement of the rotor and frame, if, for example, the frame tilts so that the bubble moves to the left as viewed in Fig. 6, the circuit through struts 31 and 33' is broken and more current passes through the oppositely disposed struts 29 and 32'. By this action, struts 33' and 31 cool and contract while struts 29 and 32' expand as the temperature of the wires is increased. As viewed in Fig. 1, this results in a relative displacement of the frame and rotor so that the center of gravity of the rotor is displaced below the axis defined by the trunnion-bearing connections 17—18. This positions the center of gravity of the frame and rotor in such a manner with relation to the major axis of the instrument that a gravitationally effective torque is exerted about an axis substantially 90° to the axis of tilt to restore the frame to a level or tilt free condition about its minor axis in a direct path, as is well understood in the art. If desired, similar mounting struts may be provided of a material whose longitudinal dimension is varied magnetostrictively. As shown in Fig. 7, a circuit similar to that shown in Fig. 6 may be employed in this connection which includes a coil 45 for each of the struts.

Figure 5:
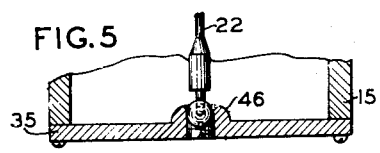
Fig. 5 is a detail view similar to Fig. 2 showing a pivotal connection for the base end of the rotor shaft in the case.

As shown in Fig. 5, one end of the mounting for the rotor in the case may be provided by a ball and socket connection 46. With this construction, a retaining means is employed for one end of the shaft 22. Thus, only one set of thermal or magnetostrictive struts need be employed. There results a rotation of the frame with the displacement of the rotor with respect to the frame, but this rotation is slight and has no appreciable effect on the instrument.

Figure 3:
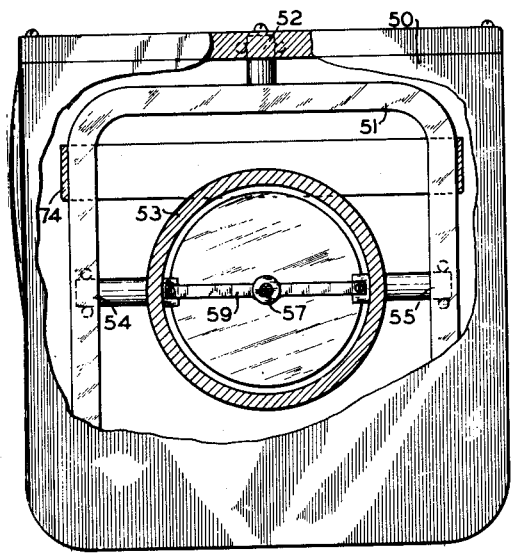
Fig. 3 is a side elevation view of an instrument of the directional gyro type illustrating a further embodiment of the invention, a part of the outer casing being broken away and one end plate of the rotor frame or case being removed.
Figure 4:
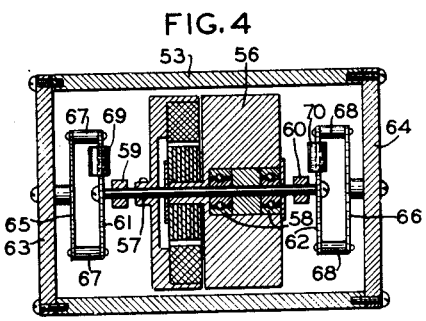
Fig. 4 is a cross-section of the rotor case or frame of the instrument shown in Fig. 3.

The gyro instrument illustrated in Figs. 3 and 4, is a directional gyro having an outer casing 50 in which is located a conventional vertical ring 51. Ring 51 is mounted to pivot about a vertical axis defined by two trunnion-bearing connections, one of which is indicated at 52. The rotor frame 53 is mounted to pivot about a horizontal axis on the ring 51 by means such as the trunnion-bearing connections 54 and 55. The rotor shaft mounting utilized in the present instance permits axial displacement of the rotor with respect to the case or frame 53. The gyro rotor 56 is rotatably mounted on shaft 57 by means of bearings 58. Shaft 57 defines the spin axis of the rotor which is normal to the axis of the frame or case 53. The shaft is slidably mounted on two cross pieces 59 and 60 that are fastened to the brackets located interiorly of the frame. The stator and rotor parts of the motor employed to spin the gyro rotor are positioned in a manner similar to that hereinbefore described in connection with Fig. 2.

Figure 8:
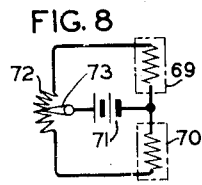
Fig. 8 is a circuit diagram showing the connections used in the form of the invention illustrated in Figs. 3 and 4.

The slidably mounted shaft 57 is positioned by means of bi-metallic strips 61 and 62 which are fixed to the respective ends of the shaft. Strips 61 and 62 are held by the end cover plates 63 and 64 for the case 53 by means of the spacer pieces 65, 66 and parts 67, 68, respectively. Heating resistors 69, 70 are employed with the respective strips 61 and 62 to provide the means for controlling the axial displacement of the shaft 57 and rotor 56 and consequently determine how the center of gravity of the balanced case is to be shifted with reference to its horizontal pivot axis. A differential bridge circuit of the character shown in Fig. 8 may be employed for this purpose, the circuit as shown including an energy source 71 and a potentiometer 72 whose variable arm 73 may be positioned under a suitable control operative to unbalance the bridge and pass energy through either one of the heating resistors 69 or 70. If, for example, energy flows through heater 69, strip 61 is rendered effective to displace the shaft 57 to the right as viewed in Fig. 4. This shifts the rotor correspondingly and the case 53 is heavy on the right side of its axis. The gravitationally effective torque present at such times causes precession of the ring 51 in azimuth and changes the indication obtained from the compass card 74 mounted in the ring 51 to an observer of the instrument. An example of an advantageous use of the form of my invention shown in Figs. 3 and 4 would be in a slaved directional gyroscope such as a gyro-magnetic compass, wherein the heaters 69 and 70 would be differentially controlled by a bridge circuit responsive to the relative displacement of the directional gyro and the slaving compass. See prior art patents to Sperry No. 1,982,702, dated December 4, 1934, and Lauck, No. 2,178,306, dated October 31, 1939.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A gyro instrument having a rotor frame which, together with its supported parts, is normally balanced about one of its axes of support, a displaceably positioned rotor part mounted in said frame, and means operable to relatively displace the rotor and frame to obtain a torque exerting unbalance of the frame with reference to the axis of support about which it is normally balanced.

2. A gyro instrument having a rotor case mounted to pivot about a horizontal axis, a laterally displaceable gyro rotor mounted in the case having a spin axis normal to the axis of the case, and means operable to control the axial displacement of the rotor to change the position of the center of gravity of the case and its supported parts with reference to its horizontal axis and thereby obtain a gravitationally effective torque about such axis.

3. A gyro instrument having a rotor frame mounted to pivot about a horizontal axis, an axially displaceable shaft in said frame on which a gyro rotor is mounted, and controllable power means operable to relatively displace the rotor shaft and frame and thereby unbalance the frame with reference to its horizontal axis to obtain a gravitationally effective torque about such axis upon excitation of said power means.

4. A gyro instrument having a bi-axially supported rotor case which, together with the rotor journaled therein, constitutes an element of the gyroscope, a radially displaceable shaft in said case on which a gyro rotor is mounted, and means for controlling the radial displacement of the rotor shaft and case to unbalance the element with reference to its respective axes of support and thereby obtain a gravitationally effective torque about such axes.

5. A directional gyro having a vertical ring, a rotor frame mounted to pivot about a horizontal axis on said ring, an axially displaceable shaft in said frame, normal to the axis of the frame, on which a gyro rotor is mounted, and means operable to cause the axial displacement of the shaft and rotor to change the position of the center of gravity of the frame, together with the supported rotor, with reference to its horizontal axis and thereby obtain a gravitationally effective torque about such axis to cause precession of the ring.

6. A directional gyro as claimed in claim 5, in which said controlling means includes a pair of temperature responsive bi-metallic strips connected to the respective ends of the shaft, and variable circuit means for differentially heating the strips to control the orientation of the gyroscope.

7. A gyro instrument having a rotor frame, a gimbal ring supporting said frame for universal movement about mutually perpendicular axes, a normally vertical shaft for a gyro rotor in said frame, retaining means for one end of the shaft permitting angular displacement of the same relative to the frame, positioning means for the other end of the shaft operable to displace the shaft and change the position of the center of gravity of the rotor with reference to the axes of support of the frame, and tilt responsive means for controlling the operation of said positioning means.

8. A gyro vertical having a gimbal ring mounted to pivot about a horizontal axis, a rotor case mounted on said ring to pivot about a horizontal axis normal to the axis of the ring, a normally vertical shaft for a gyro rotor in said case, retaining means for one end of the shaft permitting angular displacement of the same relative to the case, positioning means for the other end of the shaft operable to displace the shaft and change the position of the center of gravity of the rotor with reference to the axes of support of the case to thereby obtain a gravitationally effective torque about such axes, and means responsive to tilt of the case for controlling the operation of said positioning means.

9. A gyro vertical as claimed in claim 14, in which said positioning means is provided by a plurality of electrically conductive wires having a high temperature coefficient of expansion, said wires being spaced equiangularly about the axis of the rotor shaft and connecting one end of the shaft with the case.

10. A gyro instrument having a support, a rotor bearing frame universally pivoted therein which, together with its rotor, constitutes an element of the gyroscope, a mounting for the rotor in the frame journaling the rotor therein and facilitating relative displacement of the rotor and frame, and means operatively connected to said mounting for relatively displacing the rotor within frame to shift the center of gravity of the element and thereby produce a torque about one of the axes of support of the frame.

11. A gyro instrument having a universally supported rotor case, a displaceable shaft in said case on which a gyro rotor is mounted, said case together with its rotor constituting an element of the gyroscope, and means operatively connected to said shaft for displacing the same relative to the case, said means changing the position of the center of gravity of said element to produce a gravitational torque about one of the axes of support of the case.

12. A gyro instrument as claimed in claim 4, in which the shaft is positioned in the case by means of a number of radially extending struts that are fixed to the respective ends of the shaft.

13. A gyro instrument having a rotor frame mounted to pivot about a horizontal axis, a radially displaceable shaft in said frame on which a gyro rotor is mounted, gravitational means responsive to relative tilt of said frame and means, and power means controlled by said gravitational means operable to relatively displace the rotor shaft and frame in a direction substantially 90° to the relative tilt and thereby unbalance the frame with reference to its horizontal axis to obtain a gravitationally effective torque about an axis normal to the tilt axis.

14. A gyro instrument having a rotor frame, a gimbal ring supporting said frame for universal movement about mutually perpendicular axes, a normally vertical shaft for a gyro rotor in said frame, tension members connecting each end of the shaft to said frame to position the shaft within the frame, means for causing variation in the length of said members selectively to shift the position of said shaft and the supported rotor laterally within the frame and thereby vary the position of the center of gravity, and tilt responsive means for controlling the operation of said positioning means.

15. A gyro-vertical as claimed in claim 14, in which said positioning means is provided by a plurality of radially disposed wires or rods of magnetostrictive material and inductive windings associated therewith for selectively varying the fields through said wires.

16. A gyro-vertical having a gimbal ring mounted to pivot about a horizontal axis, a rotor case mounted on said ring to pivot about a horizontal axis normal to the axis of the ring, a normally vertical shaft for a gyro rotor in said case, supporting means for one end of the shaft permitting lateral displacement of the same relative to the case, positioning means for both ends of the shaft operable to displace the shaft and change the position of the center of gravity of the rotor with reference to the axes of support of the case to thereby obtain a gravitationally effective torque about such axes, and means responsive to tilt of the case for controlling the operation of said positioning means.

SPENCER KELLOGG, 2ND.